Sept. 8, 1970     L. W. HOLMBOE ETAL     3,528,029
RING LASER HAVING SYNCHRONIZED PHASE MODULATORS
FOR INHIBITING MODE PULLING INVENTORS
LEONHARD W. HOLMBOE
IRVING ITZKAN
BY
*Robert J. Haase*
ATTORNEY United States Patent Office 3,528,029
Patented Sept. 8, 1970

3,528,029
RING LASER HAVING SYNCHRONIZED PHASE MODULATORS FOR INHIBITING MODE PULLING
Leonhard W. Holmboe, Locust Valley, and Irving Itzkan, Great Neck, N.Y., assignors to Sperry Rand Corporation, a corporation of Delaware
Filed Sept. 20, 1966, Ser. No. 580,775
Int. Cl. H01s 3/10
U.S. Cl. 331—94.5                           3 Claims

ABSTRACT OF THE DISCLOSURE

A ring laser including a pair of light modulators spaced along the path of the contradirectional waves propagating therein a prescribed distance from one another and driven by an electrical signal having a frequency equal to the spectral free range of the laser cavity, the signal applied to one modulator being in phase quadrature with that applied to the other modulator whereby the phase shifts introduced to the contradirectional waves by the respective modulators are cumulative in one beam but cancel one another in the oppositely directed beam.

---

The present invention generally relates to ring lasers for sensing the amount of non-reciprocity within the laser cavity produced by, for example, the physical rotation of the ring, by materials placed within the ring and by fluids flowing within the ring. More particularly, the invention is concerned with travelling wave interaction means within the laser cavity for frequency modulating one but not the other of the two counterrotating laser beams in order to prevent mode pulling between the two beams and thereby permit the measurement of very small amounts of non-reciprocity within the ring.

As is now well understood, a ring laser produces two beams of coherent light which travel in opposite directions around the closed loop optical path which is the resonant cavity of the laser. Each beam of light returns to an arbitrary starting point in the path after the short but measurable interval of time required to traverse the entire closed loop at the finite velocity of light. If non-reciprocity is introduced into the path, as for example, by the rotation of the laser about an axis perpendicular to the plane of the path, the beam travelling in the same direction as the rotation would require a somewhat longer interval to return to an arbitrary point than would be the case of the beam travelling in the opposite direction. The effective path length encountered by the beam travelling in the direction of ring rotation is lengthened by the distance that the arbitrary point moves while the beam completes one traversal of the path. A beam of light travelling in the direction opposite to the ring rotation returns to an arbitrary point in less time than if the ring laser were not rotating because the effective path length of one traversal is shortened. The difference in the effective path length traversed by the two beams and, hence, the difference in frequency between the two beams is related to the rotational rate of the ring laser. By extracting the counterrotating beams from the closed loop and heterodyning the extracted beams to produce a beat note, the rotational rate of the ring laser can be determined.

The frequency of the beat note should be directly related to the magnitude of the non-reciprocity, e.g., attributable to the physical rotation of the ring laser, over a wide range of values. It has been found, however, that a minimum finite value of rotation exists below which the frequency of the beat note suddenly reduces to zero. The phenomenon of mode locking, i.e., the abrupt frequency synchronization of the two oppositely travelling waves and the consequent loss of the beat signal below a critical value of non-reciprocity, e.g., below a critical value of physical rotation of the ring laser, precludes continuity of measurement. Thus, very low rotations, would escape detection unless a way were found of avoiding the phenomenon of mode locking so that the frequency of the beat note would decrease uniformly with uniformly decreasing rotational rates until zero rotational rate is reached.

Various techniques have been proposed for minimizing mode pulling between the oppositely travelling waves within a ring laser. Generally, the techniques involve modification of the ring laser whereby the frequencies of the counterrotating beams are offset from each other even in the absence of any finite value of rotation to be measured. It can be seen that if a known frequency offset bias is maintained in the absence of ring rotation, for example, and the direction of allowable rotation is such as to increase said frequency offset, then mode pulling is eliminated for all values of physical rotation to be measured. It is characteristic of prior art anti-mode pulling methods that the frequency offset bias is indistinguishable except as to magnitude from the further frequency offset produced by the rotation to be measured.

One object of the present invention is to prevent mode pulling between the counterrotating beams of a ring laser by alteration of the frequency spectrum of one beam in a manner distinguishable from the alteration produced by the non-reciprocity to be measured.

Another object is to provide means to modulate continuously only one of the two counterrotating beams of a ring laser to avoid mode locking between said beams.

A further object is to modify only one of the two counterrotating beams of a ring laser so that the frequency values of the components of the two beams are substantially different from each other.

These and other objects of the present invention, as will appear from a reading of the following specification, are accomplished in the disclosed embodiment by the provision of a ring laser having a lasing medium positioned within a closed loop resonant optical path. A pair of phase modulators also are positioned within the optical path and are spaced from each other by one-quarter of the distance around the entire path. Consequently, one of the counterrotating beams traversing the closed loop optical path encounters the second modulator after traversing only one-quarter of the closed path circumference from the first modulator whereas the oppositely rotating beam encounters the second modulator after traversing three-quarters of the closed path circumference from the first modulator. Means are provided for exciting the two modulators in phase quadrature relative to each other by a signal having a frequency approximately equal to the spectral free range frequency of the laser cavity. The value of the spectral free range frequency of the laser cavity is equal to the quotient of the velocity of light and the circumference of the closed loop optical path.

The quadrature spaced and quadrature driven phase modulators introduce a non-reciprocal effect within the laser resonant cavity whereby one of the counterrotating beams becomes frequency modulated while the other beam is unaffected. By proper adjustment of the amplitude and the frequency of the modulating signal, the signal spectrum of the frequency modulated beam can be limited to frequency values at other than the frequency value of the unmodulated beam. The substantial non-concurrence between the frequency values of the components of the two counterrotating beams prevents mode pulling between the two counterrotating beams.

For a more complete understanding of the present invention, reference should be had to the following specification and to the drawings of which:

Figure 1:
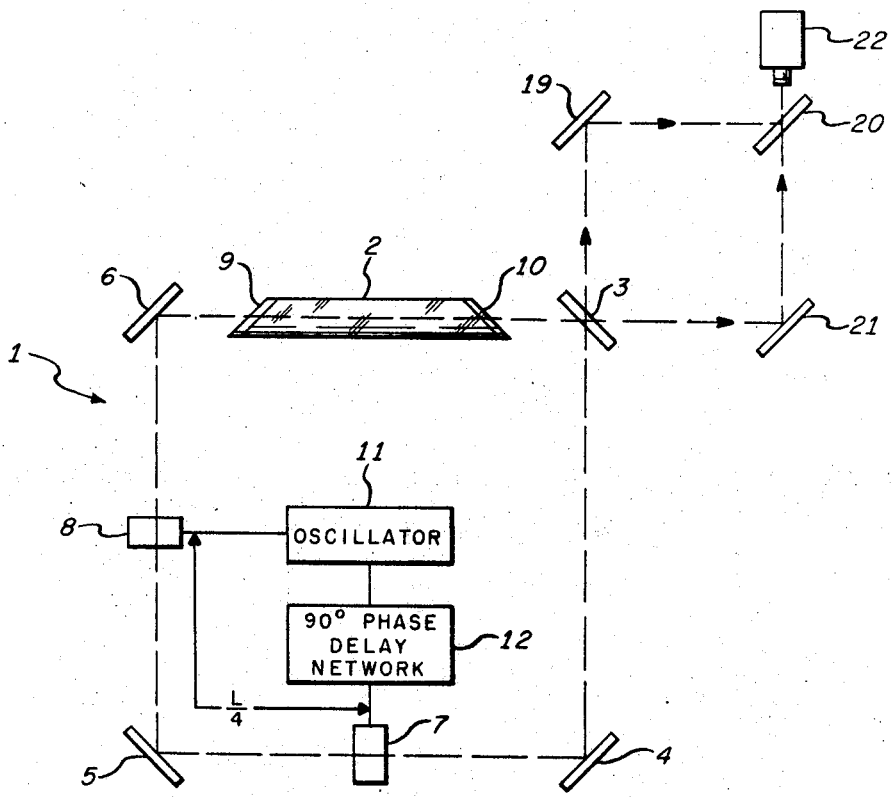
FIG. 1 is a simplified schematic diagram of a typical embodiment of the present invention for sensing physical rotations.

Referring to FIG. 1, a square "ring" laser is generally represented by the numeral 1. The configuration or shape of the ring laser is not material to the present invention, the square shape being shown by way of example. Ring laser 1 comprises a plasma tube 2, for example, a helium-neon gas laser tube, corner mirrors 3, 4, 5 and 6 and phase modulators 7 and 8. Plasma tube 2 is equipped with Brewster angle windows 9 and 10 through which pass identically linearly polarized beams of light traveling in opposite directions around the ring. Each of the phase modulators 7 and 8 may be a simple Pockels effect phase modulator which is well known in the art. Phase modulators 7 and 8 are spaced from each other by a distance equal to one-quarter of the circumference of the closed loop optical path measured in one direction around the ring and by a distance equal to three-quarters of said circumference when measured in the opposite direction around the ring. Oscillator 11 provides a modulating signal at approximately the spectral free range frequency of the ring laser cavity. The modulating signal is applied directly to modulator 8 and, via 90° phase delay network 12, to modulator 7.

The index of refraction encountered by the two linearly polarized counterrotating light beams within each of phase modulators 7 and 8 varies in accordance with the instantaneous amplitude of the modulating signal applied thereto. Inasmuch as the two counterrotating beams are identically linearly polarized, each beam is affected in the same way within each modulator. However, the quadrature spacing of the two modulators and the quadrature electrical phasing of the modulating signals applied thereto produce a non-reciprocal effect whereby one of the counterrotating beams is unaffected and the other counterrotating beam becomes frequency modulated. This result can be understood by reference to the space-time plot of FIG. 2.

Figure 2:
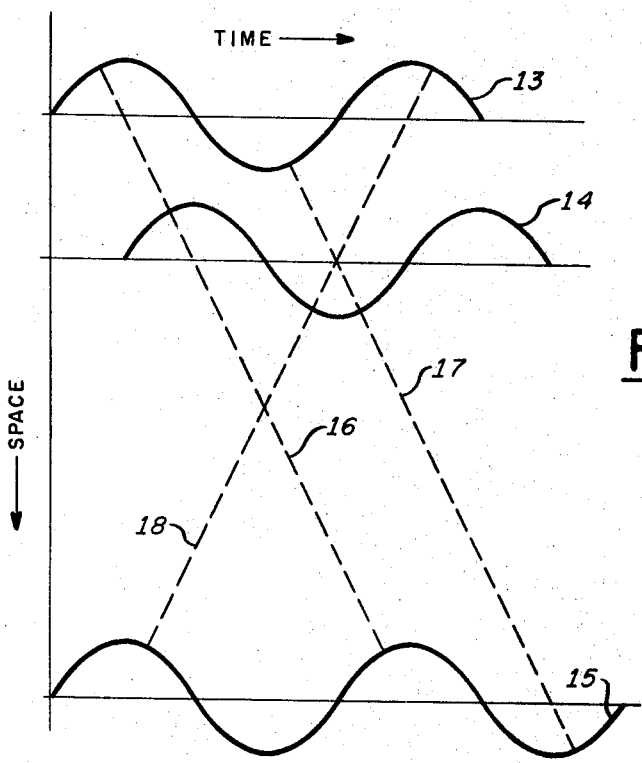
FIG. 2 is a space-time plot for aiding an understanding of the operation of the phase modulators of the embodiment of FIG. 1.

Each of sine waves 13 and 14 of FIG. 2 represents the cyclical phase advance and phase retardation within phase modulators 8 and 7, respectively, resulting from the application of the modulating signal derived from oscillator 11. The abscissa of the plots represents time whereas the ordinate of the plots represents space. Sine wave 15 also represents the cyclical phase variation in modulator 8 and for this reason is electrically in time phase with sine wave 13. However, sine wave 15 is vertically displaced in the plot of FIG. 2 from sine wave 13 by an amount representing the circumference of the closed loop optical path of the ring laser. Sine wave 14 is vertically displaced by ¼ of said circumference and is horizontally displaced by ¼ cycle of the modulating frequency relative to sine wave 13 to represent the quadrature space and time phase relationship between modulators 7 and 8.

Dotted diagonal lines 16, 17 and 18 represent the electrical and spacial coordinates of the two counterrotating beams as they traverse one complete circuit of the ring. Identically sloped lines 16 and 17 represent the beam traveling counterclockwise about the ring in the view of FIG. 1 whereas oppositely sloped line 18 represents the beam traveling in the clockwise direction. Following along 16 beginning at the location of sine wave 13, one observes that the counterclockwise wave experiences the same phase advance each time that it encounters a phase modulator in its traversal about the ring. Similarly, as shown by line 17, the same counterclockwise rotating wave experiences a phase retardation effect (a half cycle of the modulating signal later) each time that it encounters a modulator. Thus, the two modulators 7 and 8 produce a cumulative effect on the counterclockwise rotating light beam.

Conversely, the clockwise rotating beam represented by line 18 passes through modulator 8 at a time when the respective modulating signal produces a phase advance effect but passes through modulator 7 at a time when the respective modulating signal produces a phase retardation effect. It can be further seen that as the clockwise rotating wave again encounters modulator 8 at the start of a new traversal of the ring, the respective modulating signal produces another phase advance effect. Thus, a net zero effect is produced on the clockwise wave for each complete circuit of the ring laser.

The electrical path length encountered by the counterclockwise rotating wave continuously changes at a rate determined by the frequency of the modulating signal. The unchanging optical path length encountered by the clockwise rotating wave permits said wave to remain at a constant fixed frequency as though neither phase modulator 7 nor 8 were present. The constantly changing optical path length encountered by the counterclockwise rotating wave produces frequency modulation of said wave at the frequency of the modulating signal. From a frequency domain point of view, the counterclockwise rotating wave is a frequency modulated wave having sidebands approximately spaced by the spectral free range of the ring laser and having amplitudes given by Bessel functions of the frequency modulation index. When the clockwise and the counterclockwise rotating beams are heterodyned together, a beat note is generated having a frequency representing the physical rotation of the ring laser about an axis perpendicular to the plane of the ring. The two counterrotating beams are extracted from the ring cavity and heterodyned together in a conventional manner with the aid of mirrors 19, 20 and 21 and photodetector 22 of FIG. 1.

Preferably, the amplitude of the modulating signal applied to modulators 7 and 8 is adjusted so that substantially no energy appears in the carrier term of the resulting frequency modulated signal. It should be noted, however, that although the carrier term of the frequency modulated beam is substantially zero in the preferred case, a sufficient amount of energy is present at the output of the photodetector 22 representing the ring laser rotation rate. The beat note component of interest is the lowest frequency signal component at the output of the photodetector and can be conveniently separated from the other signal components by means of a low pass filter.

Figure 3:
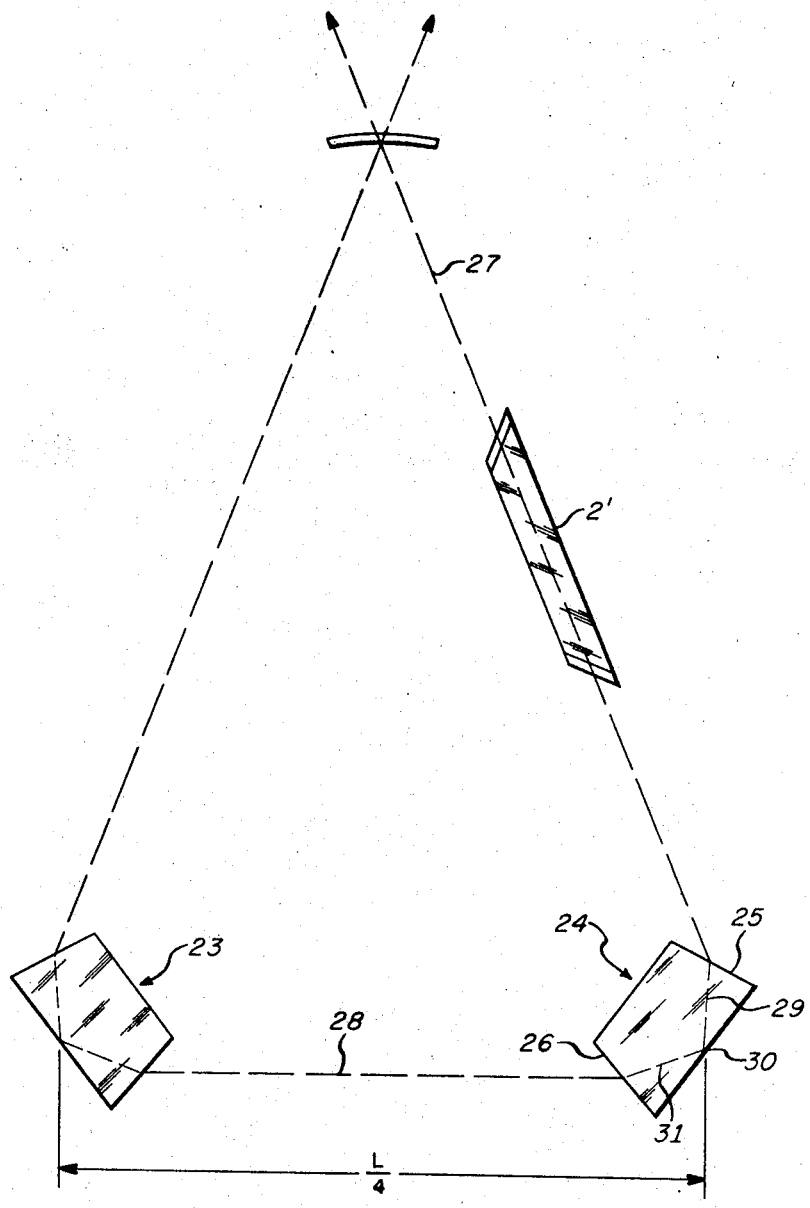
FIG. 3 is a simplified schematic diagram of an embodiment alternative to the embodiment of FIG. 1.

In the embodiment of FIG. 3, the functions of a corner reflector and a phase modulator are combined in a single structure. Each of corner members 23 and 24 comprises an electro-optic material to which a modulating signal can be applied for changing the index of refraction. The faces of each corner member encountered by the ring laser beams such as faces 25 and 26 of member 24 are inclined at Brewster's angle relative to the optical path axes 27 and 28 to permit substantially 100% transmission of the incident beams at said faces. The clockwise rotating beam entering the face 25 of member 24 is refracted in the direction of line 29, is totally reflected at point 30 and redirected along line 31, and is again refracted at face 26 along axis 28. The action is completely reciprocal in that the counterclockwise beam entering face 26 of member 24 is redirected along paths 31, 29 and 27. Similar operation takes place within corner member 23.

It should be noted that the value of the index of refraction of each corner member changes only slightly as a result of the application of the respective modulating voltage so that substantially the same optical path direction is traversed at all times by each of the counterrotating beams as they travel through each corner member. The change in the value of the index of refraction, however, is sufficient to vary the effective optical path length encountered by each beam internally within each corner member in the same manner that the effective optical path length encountered by the beams in the embodiment of FIG. 1 is varied by phase modulators 7 and 8. Corner members 23 and 24 of FIG. 3 are separated from each other by one-quarter of the total circumference of the ring cavity and are excited by quadrature signals (not shown) at approximately the spectral free range frequency of the ring laser in the same manner as modulators 7 and 8 of FIG. 1. As in the case of modulators 7 and 8 of FIG. 1, corner members 23 and 24 of FIG. 3 frequency modulate one of the counterrotating beams without affecting the other beam. Although the operation and result of the embodiment of FIG. 3 are substantially the same as those of the embodiment of FIG. 1, the former is advantageous because of its relative structural simplicity attributable to the combining of the corner mirror and modulator functions in fewer structures.

Although the modulators are spaced from each other by one-quarter of the length of the closed loop optical path of the ring lasers of FIGS. 1 and 3 and are driven in phase quadrature, it will be recognized by those skilled in the art that the spacing and the phasing can deviate somewhat with a similar result of reducing mode pulling between the laser beams but at the expense of lowered efficiency.

What is claimed is:
1. A ring laser comprising:
   a closed loop optical path,
   means including a light source for establishing a pair of light beams propagating in opposite directions around said path,
   a pair of optical phase modulators disposed in spaced relation along said path,
   a source of modulating signals having a frequency approximately equal to the spectral free range frequency of said path for applying respective excitation signals to said modulators, said excitation signals being phase shifted relative to one another in accordance with the spacing between said modulators such that the phase change introduced to one of said oppositely propagating beams by one modulator is negated by the phase change introduced to said one beam by the other modulator and the phase changes introduced in the other of said oppositely propagating beams by the respective modulators reinforce one another, and
   means for heterodyning said one beam and said other beam.

2. The apparatus of claim 1 wherein said modulators are spaced from each other by approximately one quarter of the length of said path and the excitation signals applied to the respective modulators are in phase quadrature.

3. A ring laser comprising:
   a closed loop optical path,
   means including a light source for establishing a pair of light beams propagating in opposite directions around said path,
   a pair of optical phase modulators positioned within said path,
   said modulators being spaced from each other by approximately one-quarter of the length of said path, and
   a source of modulating signals having a frequency approximately equal to the spectral free range frequency of said path,
   said signal being applied approximately in phase quadrature to said modulators whereby the phase change introduced to one of said oppositely propagating beams by one modulator is negated by the phase change introduced to said one beam by the other modulator and the phase changes introduced in the other of said oppositely propagating beams by the respective modulators reinforce one another.

References Cited
UNITED STATES PATENTS

| | | | |
|---|---|---|---|
| 3,366,792 | 1/1968 | Ohm | 331—94.5 X |
| 3,382,758 | 5/1968 | Wang | 356—106 |
| 3,392,622 | 7/1968 | Senf | 356—106 |
| 3,393,955 | 7/1968 | Sterzer | 350—150 |

RONALD L. WIBERT, Primary Examiner

E. BAUER, Assistant Examiner

U.S. Cl. X.R.

350—150, 160; 356—106